United States Patent [19]

Weiss

[11] 4,369,460

[45] Jan. 18, 1983

[54] COLOR-PICTURE TUBE WITHOUT SHADOW MASK AND WITH ONLY ONE ELECTRON GUN

[75] Inventor: Eberhard Weiss, Stuttgart, Fed. Rep. of Germany

[73] Assignee: International Standard Electric Corporation, New York, N.Y.

[21] Appl. No.: 231,559

[22] Filed: Feb. 4, 1981

[30] Foreign Application Priority Data

Feb. 16, 1980 [DE] Fed. Rep. of Germany ....... 3005946

[51] Int. Cl.³ .............................................. H04N 9/24
[52] U.S. Cl. ....................................... 358/67; 358/68
[58] Field of Search ................................ 358/68, 67

[56] References Cited

U.S. PATENT DOCUMENTS 2,685,047  7/1954  Moore .................................. 358/68
2,752,416  6/1956  Sziklai .................................. 358/68
3,939,486  2/1976  Tomii .................................... 358/67

Primary Examiner—Richard Murray
Attorney, Agent, or Firm—John T. O'Halloran; Robert E. Lee, Jr.

[57] ABSTRACT

In a single gun, horizontal stripe color picture tube, including a deflection system for scanning a single beam across groups of horizontal strips coated on a screen, chromaticity of colors to be produced is determined by position of the beam spot within a stripe-group and by the beam current. A vertical, comb-shaped electrode having teeth aligned with groups of strips is mounted along at least one vertical edge of the screen, outside the optically used area of the screen. Means are coupled to the electrode for producing a control signal having a magnitude determined by the displacement of the beam from a desired vertical position relative to the teeth of the electrode which control signal is applied to the deflection system for correcting the displacement.

6 Claims, 9 Drawing Figures

COLOR-PICTURE TUBE WITHOUT SHADOW MASK AND WITH ONLY ONE ELECTRON GUN

BACKGROUND OF THE INVENTION

The present invention relates to color-picture tubes with a screen coated with groups of phosphor stripes, areas of which are caused to glow by electrons incident on them, which electrons are deflected by a deflection system.

Various technical solutions have been provided for reproducing colors with color-picture tubes. Most of them are based on the assumption that three independent variables are required for unambiguously defining a color. Each color is given by chromaticity and luminance. To define chromaticity, two independent variables are required. Therefore, chromaticity can be easily presented in two-dimensional representations, such as the color circle or the chromaticity diagram. In most types of color-picture tubes, the three variables are realized by choosing three primary colors, usually red, green and blue, selecting corresponding phosphors, and exciting each of these phosphors with electron beams and with different beam currents. In that case, therefore, the three independent variables are the electron beam currents, which can be varied independently of each other.

The various color-picture tube systems differ in the method by which the electron beams are caused to hit the phosphors they are meant to strike. In the system which is in most widespread use, groups of vertical primary color-phosphor stripes are deposited on a screen, and an electron beam sweeps horizontally across these stripes. Before striking the phosphor stripes, the beam passes through a so-called color selection electrode. This method leads to excellent color reproductions but is very expensive. DE-OS 25 23 524 discloses a color-picture tube in which no color selection electrode is required. Groups of horizontal phosphor stripes are swept horizontally by three electron beams whose currents are adjustable independently of each other. This solution represents a considerable simplification over color-picture tubes having color selection electrodes. A major problem is, however, that each of the three electron beams must at any time be precisely adjusted to prevent an electron beam assigned to, e.g., the primary color red from also exciting phosphor stripes of the color green or blue.

SUMMARY OF THE INVENTION

The object of the present invention is to provide a color-picture tube having a screen coated with groups of horizontal phosphor stripes, areas of which are caused to glow by electrons incident on them, wherein the need for the vertical adjustment of three electron beams whose currents are adjustable independently of each other is eliminated.

This object is attained by providing a color-picture tube with a screen coated with groups of horizontal phosphor stripes, areas of which are caused to glow by electrons incident on them, and with a deflection system deflecting the electrons, characterized in that the color-picture tube has only one electron gun, that the electron beam produced by this electron gun is scanned across the screen group after group in the horizontal direction, that the chromaticity of the respective color to be produced is determined by the position of the electron spot within a phosphor-stripe group and by the spot size, and that luminance is controlled by the beam current. The color-picture tube has only one electron gun. The independent three variables required to reproduce any color are the position of the electron spot within the group of phosphor stripes, the electron spot area, and the beam current. Ways of realizing each of these variables have been known for a long time. For instance, in conventional color-picture tube systems in which three electron beams move over horizontal phosphor stripes in the horizontal direction, it is advantageous to monitor the electron beams for their vertical position. To this end, it is proposed that comb-shaped electrodes are mounted at the edges of the screen in the optionally unused area, which are struck by the electron beam during its horizontal sweep, whereby a control pulse is produced whose magnitude depends on the displacement of the electron beam from the required position, and which is used to correct the deviation of the vertical deflection. A particularly advantageous embodiment of the teeth of the comb-shaped electrode, which permits an unambiguous determination of the direction of the displacement, is provided by arranging the teeth so as to form a horizontal boundary and an inclined boundary and such that the minimum width of the teeth is equal to the vertical dimension of the electron spot in optically unused (marginal) zones.

Each group of phosphor stripes preferably consists of three stripes of red, green, and blue phosphor of the chromaticity standardized for the reception of color-television program, so that if the novel color-picture tubes are used in conventional color-television receivers, the existing input circuits can be employed.

In a color-television set with a conventional picture tube, three voltages $U_R$, $U_G$, $U_B$ are applied to the picture tube for adjusting the three electron beam currents. These three voltages can be used to advantage in a color-picture tube according to the invention to define the color by the position of the electron spot, the spot size, and the beam current.

BRIEF DESCRIPTION OF THE DRAWINGS

Embodiments of the invention will now be explained in more detail with reference to the accompanying drawings, in which.

DESCRIPTION OF THE BEST MODE

Figure 1:
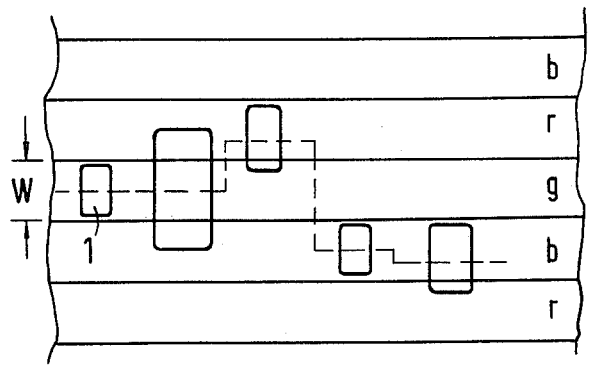
FIG. 1 shows part of a screen according to the invention, with electron spots of different position and different size.

FIG. 1 shows part of a screen of the kind proposed herein. Phosphor stripes of width W extend in the horizontal direction and are arranged one on top of another. According to the colors red, green and blue, which are emitted by the phosphor stripes in those areas where an electron beam is incident on them, the individual stripes are designated r, g, b. The stripes are arranged in such a sequence that every fourth stripe has the same color as the initial stripe. Every three successive phosphor stripes form a group. FIG. 1 also shows five electron beam spots on the phosphor stripes. The center of the first spot from the left lies in the middle of a green phosphor stripe, and this spot is so limited in size that it does not exceed the edges of the green phosphor stripe. Thus a purely green area will be produced whose luminance is adjustable via the beam current. The second spot from the left also has its center located in the middle of the green phosphor stripe. However, it is considerably larger than the first spot and also covers parts of the red and blue phosphor stripes. There will appear a luminous area of a color which contains a large green component and smaller components of red and blue. The center of the third spot from the left is shifted beyond the upper edge of the green stripe and lies in the area of the red stripe. This spot covers a major portion of the red stripe and a small portion of the green stripe. As the electron beam progresses to the right, it is shifted so that the center of the fourth spot lies in the middle of the blue stripe, and its area does not exceed the limits of the blue stripe. The center of the fifth spot is even further away from the green stripe, and the area of this spot is chosen so that the chromaticity of the resulting color is determined by a large blue component and a smaller red component, while the luminance is determined by the magnitude of the beam current. It is thus apparent that any color can be produced by varying the position, cross-sectional area, and current of an electron beam.

So far, for simplicity, a rectangular spot has been shown instead of a circular or oval one as is present in reality. The simplification provided by the rectangular spot will be retained in the following. The fact that a round spot is present in reality is immaterial to the invention as such. The formulas given in the following would become much more complicated, however.

Figure 2:
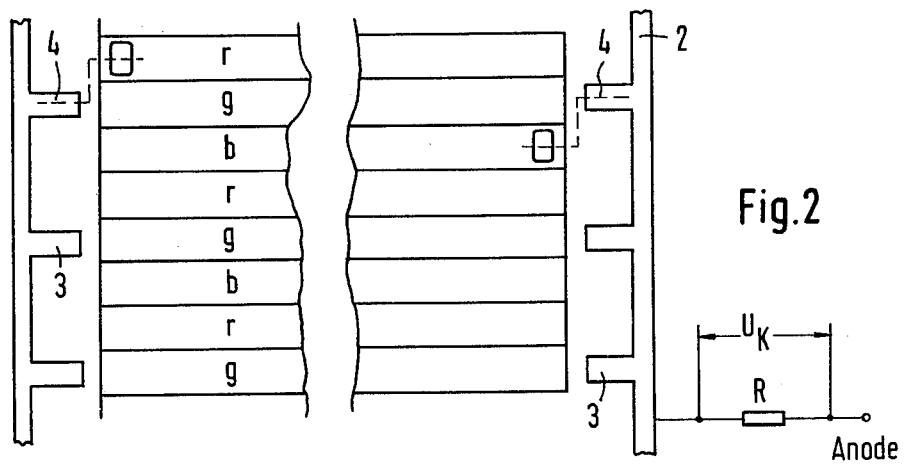
FIG. 2 shows part of a screen according to the invention with comb-shaped electrodes at the sides of the screen.

Since the exact maintenance of a predetermined position of an electron beam is of decisive importance for the desired color reproduction, it is advantageous to check the vertical position of the beam at least from time to time. To this end, a vertical, comb-shaped electrode 2 is mounted ouside the optically used area of the screen at the right-hand and/or the left-hand vertical edge thereof, as shown in FIG. 2. The electron beam strikes the teeth 3 of this comb-shaped electrode at the end and/or the beginning of its horizontal movement and produces a correcting voltage which is used to detect any deviation of the electron beam from its required (or desired) position and to correct this deviation. How the correcting voltage is obtained is shown schematically in FIG. 2. The comb-shaped electrode is connected to the anode via a resistor R, from which the correcting voltage $U_K$ can be taken. An exact circuit is, of course, more complicated but immaterial to the present invention. FIG. 2 shows part of a screen with horizontal phosphor stripes arranged one on top of another. Two comb-shaped electrodes 2 are mounted, respectively at the left-hand and right-hand edges of the phosphor stripes. The movement of an electron beam in the marginal zones is indicated by broken lines. Coming from the left, the electron beam is first adjusted to move exactly in the middle of a tooth 3 of the comb-shaped electrode at the left edge of the picture. Before striking the phosphor stripes, the electron beam is vertically adjusted so as to hit the phosphor stripe(s) required to produce the desired color, in FIG. 2 the color red. Having arrived at the right-hand edge of the picture, the electron beam excites the blue phosphor. Moving on to the right, it leaves the phosphor stripes and returns to its required horizontal position 4. If displaced from this required horizontal position, the beam will be corrected to the required position as a function of the measured voltage $U_K$.

Figure 3A:
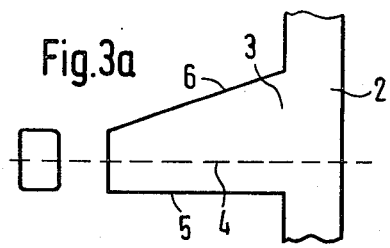
FIG. 3 shows preferred embodiments of the teeth of a comb-shaped electrode as illustrated in FIG. 2, FIG. 3a showing the the correct position of an electron beam striking a tooth, FIG. 3b showing an electron beam displaced downward from the required position, and FIG. 3c showing an electron beam displaced upward from the required position.
Figure 3B:
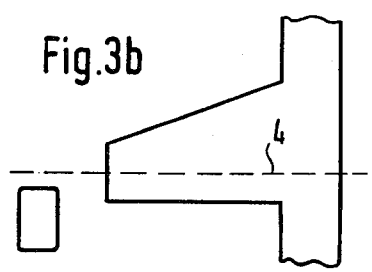
Figure 3C:
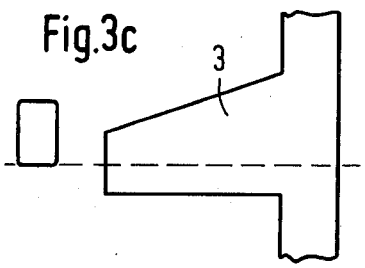

FIG. 3 shows a preferred embodiment of a tooth 3 of a comb-shaped electrode 2. The lower boundary 5 of the tooth is horizontal, while the upper boundary 6 is inclined with respect to the lower boundary 5. The electron spot 1 in the optically unused marginal zones of the screen is automatically adjusted to the smallest vertical dimension of a tooth. FIG. 3a shows a spot produced by an electron beam which is moving toward the tooth 3 in the required position 4 (broken line). In FIGS. 3b and 3c, the electron spot is located, respectively, below and above the required position.

Figure 4:
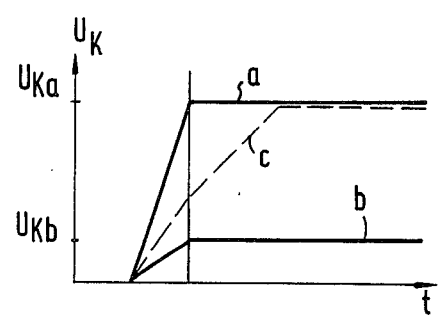
FIG. 4 shows the voltages across the resistor R of FIG. 1 when an electron beam strikes the tooth of a comb-shaped electrode at different points.

FIG. 4 shows the variation with time of the correction voltage $U_K$ taken off the resistor R, assuming different positions of the electron spot as shown in FIGS. 3a to 3c. In FIG. 3a, the electron beam strikes the width A of the tooth 3 with the width A of its spot 1. The voltage $U_K$ rises quickly and then remains constant at a maximum value $U_{Ka}$. In the case of FIG. 3b, where the electron beam is below the required position, the spot never covers the tooth 3 with its full dimension A. The voltage $U_{Kb}$ is considerably smaller than the voltage $U_{Ka}$, measured in case of full impingement. If the electron spot lies above the required position, as shown in FIG. 3c, the voltage $U_K$ rises monotonically, because the upper boundary of the tooth 3 ascends in the horizontal direction, so that the spot covers increasing areas of the tooth 3. The voltage curve thus permits the direction of the beam displacement, i.e. upwards or downards, to be determined, while the value of the voltage taken off the resistor R is a measure of the magnitude of the displacement. From the magnitude of the correcting voltage $U_K$ a further voltage is derived which is applied to the vertical deflection electrodes and adjusts the beam to the required position.

It will now be explained how the three voltages $U_R$, $U_G$, $U_B$, which are available in a normal three-beam color-picture tube for controlling the currents of the three electron beams, are used in the proposed picture tube to fix beam position, beam size, and beam current. At this point the following should be mentioned. During the transmission of color-television signals, standardized color values are used. As a result, phosphors of standardized color are used in color-picture tubes. The following therefore relates exclusively to those color-picture tubes in which phosphors with conventional standardized colors are used. Furthermore, it should be noted that in shadow mask tubes, all electron spots have the same dimensions. Let us assume that a color is to be produced in which the beam current required for exciting the blue phosphor stripes is one-half that required for exciting the red phosphor stripes. Applied to the proposed color-picture tube, in which only a single electron beam is available, this means that this beam may excite an area of the blue phosphor stripes which is only half as large as the excited area of the red phosphor stripes. This will be illustrated quantitively with the aid of FIG. 5.

Figure 5:
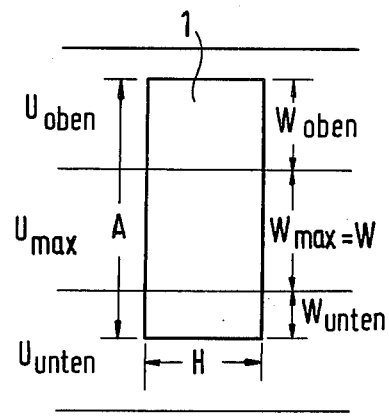
FIG. 5 shows a rectangular electron spot on a group of phosphor stripes.

FIG. 5 shows three phosphor stripes which are struck by an electron beam with a rectangular spot 1. The phosphor stripes are no longer designated r, g, b, but the spot center is assumed to lie on the stripe to which the maximum drive voltage $U_{max}$ is assigned. In a conventional system, the relative drive voltages of the three phosphor stripes and the relative strengths of the signal components are well known. The three voltages $U_R$, $U_G$, $U_B$ are assumed to be available in the television set for controlling the three beam currents. The voltage $U_R$ is assumed to be the maximum of the three component voltages, i.e., $U_R = U_{max}$, so the center of the spot would initially be located on one of the red phosphor stripes. In the embodiment shown in the figures so far, a blue phosphor stripe lies above a red phosphor stripe, and a green phosphor stripe lies below the red phosphor stripe. In a conventional color-television set, the beam current for exciting the blue phosphor stripe is given by the voltage $U_B$, and the beam current for exciting the green phosphor stripe is given by the voltage $U_G$. In FIG. 5, these voltages are designated $U_{oben}$ and $U_{unten}$, respectively. Thus, $U_{oben} = U_B$, $U_{max} = U_R$, and $U_{unten} = U_G$. As assumed hereinabove for ease of explanation, a color is to be produced in which the beam current required to excite the blue phosphor is one-half the beam current required for the red phosphor. As also explained in the foregoing, however, since the electron spots in conventional color-picture tubes are equal in area, the beam current ratio is equal to the control voltage ratio; that is, $$I_{oben}/I_{max} = U_{oben}/U_{max} \quad (1)$$

In the case of the color-picture tube described herein, however, the beam currents for the individual colors are determined not directly via the voltage ratios but directly via the area ratios of the spot on the different phosphor stripes. At a length H of the electron spot 1 in the horizontal direction, and widths $W_{oben}$, $W_{max}$, and $W_{unten}$ in the vertical direction on the different phosphor stripes, the subareas of the spot on the different phosphor stripes are given by $W_{oben} \times H$, $W_{max} \times H$, and $W_{unten} \times H$, always assuming that $W_{max} = W$, i.e., the width of the phosphor stripes. The current ratio is thus given by $$I_{oben}/I_{max} = W_{oben} \times H/W \times H. \quad (2)$$

Using equation (1), $$U_{oben}/U_{max} = W_{oben}/W.$$

Solving for $W_{oben}$, $$W_{oben} = W \times U_{oben}/U_{max}.$$

Correspondingly, $$W_{unten} = W \times U_{unten}/U_{max}.$$

Thus, the overall dimension A of the electron spot in the vertical direction is $$A = W_{oben} + W_{max} + W_{unten} = W(1 + U_{oben}/U_{max} + U_{unten}/U_{max})$$

However, the size of the electron beam at the screen is determined by the focusing voltage. Various designs for controlling the beam size and, hence, the spot size on the phosphor stripes are known, such as that disclosed in DE-OS 29 05 479. In the present case, a voltage proportional to $(1 + U_{oben}/U_{max} + U_{unten}/U_{max})$ is applied to the focusing electrode in the electron gun.

The size of the electron beam can also be seemingly increased by moving it up and down very quickly compared to the horizontal movement. To accomplish this, the voltage proportional to $(1 + U_{oben}/U_{max} + U_{unten}/U_{max})$ is converted into an alternating voltage having an amplitude proportional to the proportional voltage, and this alternating voltage is applied to the vertical deflection coils or even better to an auxiliary deflection coil. The amplitude is chosen so that the electron beam quickly moving up and down on the screen creates the impression of a spot of the vertical extension A.

In the foregoing it was described how the size of the electron beam can be derived from the voltages $U_R$, $U_G$, $U_B$, which are present in conventional color-television sets. It will now be explained how the position of the beam is adjusted. This is apparent from FIG. 5 and the above equations. The center of the electron spot 1 is at A/2 below the upper edge of the spot. Referred to the upper edge of the phosphor stripe having the maximum voltage $U_{max}$ assigned thereto, the spot center is thus at $(A/2 - W_{oben})$. Using equation (2)

$$W_{oben} - A/2 = W/2(1 + U_{oben}/U_{max} - U_{unten}/U_{max}).$$

If $U_{oben}$ and $U_{unten} = 0$, the center of the electron spot is exactly in the middle of the phosphor stripe having its discrete voltage, in this case $U_{max}$, assigned thereto. The vertical extension A of the spot is then exactly equal to the width W of a phosphor stripe. Depending on the magnitude of the voltage $U_{oben}$ or $U_{unten}$, the spot will be shifted further upwards or downwards from the middle of the phosphor stripe having $U_{max}$ assigned thereto. The correcting voltage derived from $(1 + U_{oben}/U_{max} - U_{unten}/U_{max})$, just as the voltage derived from the comb-shaped electrodes for correcting the position of the beam, is applied to the vertical deflection coils, which deflect the beam so that it assumes the position satisfying the geometric requirements.

Assuming a rectangular electron spot, the method can thus be summarized as follows: Of the three voltages $U_R$, $U_G$, $U_B$, which are available in a three-beam color-picture tube for controlling the currents of the three electron beams, the maximum voltage $U_{max}$ is first determined. This may then be used as a base voltage. If two of the three voltages or even all three voltages are equal, any one of them is taken as $U_{max}$ and is used as a base voltage. Then it is determined which phosphor stripes lie above and below the stripe having $U_{max}$ assigned thereto. Thereafter the vertical coordinate of the electron spot is defined by a voltage $U_y$ proportional to $(U_{max} + U_{oben} - U_{unten})$. For $U_y = 0$, the electron spot center is in the middle of the phosphor stripe having $U_{max}$ assigned thereto. The vertical dimension A of the spot is determined by a voltage proportional to $(U_{max} + U_{oben} + U_{unten})$, which is applied to the focusing electrode of the electron gun. The beam intensity is also adjusted in proportion to $U_{max} + U_{oben} + U_{unten}$.

Figures 6A, 6B:
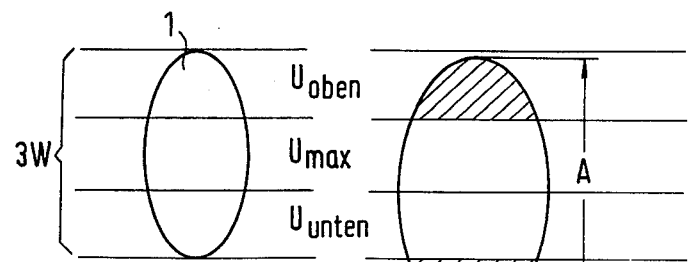
FIG. 6 shows an oval electron spot on a group of phosphor stripes.

During the adjustment a problem arises from the fact that precisely rectangular spots are very difficult to achieve in practice. The spots are normally round or oval. FIG. 6a shows such an oval spot 1, which extends over the full width 3W of three adjacent phosphor stripes. Assuming that the spot is to cover equal areas on all three phosphor stripes, it is readily apparent that this requirement cannot be met with an oval spot. The areas covered on the upper and lower phosphor stripes are considerably smaller than the area covered on the middle stripe. Thus, an adjustment different from that described so far must be performed if three areas of the same size on three adjacent phosphor stripes are to be excited by an oval electron beam. How this is done is shown in FIG. 6b.

In FIG. 6b, the center of the spot no longer coincides with the middle of the phosphor stripe assigned to $U_{max}$ but is referred to the lower edge of this stripe. From the symmetry conditions it is readily apparent that the covered areas of the phosphor stripes assigned to $U_{max}$ and $U_{unten}$ are identical. Unlike in the embodiments described so far, however, the spot covers two phosphor stripes of the color assigned to $U_{oben}$. These areas are shown hatched.

It is now readily possible to choose the vertical extension A of the spot so that the sum of the hatched areas is equal to one of the phosphor-stripe areas assigned to $U_{max}$ and $U_{unten}$. Thus the spot center is no longer referred to the middle of the phosphor stripe assigned to $U_{max}$ but to the lower edge of this stripe, and the vertical extension of the spot is chosen so that the spot covers four stripes. This is done until the difference in area required for color reproduction, i.e., the difference between the upper or lower area and the middle area is equal to or smaller than the middle area. When this has been achieved, a method analogous to that described above is used.

In the above description it is assumed that each of the phosphor-stripe groups used consists of three stripes of phosphors which are standardized for the reception of color-television programs. It is, of course, possible to use other phosphors of nonstandard color. This must be taken into account in the above formulas and methods by choosing suitable proportionality factors which allow for the deviation of the selected colors from the standardized colors. The three phosphor stripes of different color may, of course, be replaced by phosphor-stripe groups of four or only two different colors. The use of four colors appears to involve a redundancy but has been proposed in several publications because it offers certain technical advantages in specific applications. The reproduction with only two colors is based on Land's color theory. However, color-television sets working on the principles of this theory have not found acceptance because the respective color sensation greatly depends on the viewer. If only two phosphor stripes are used, the spot size is advantageously kept constant, and only the position of the electron beam and the beam current are varied.

I claim:

1. A color-picture tube with a screen coated with groups of horizontal phosphor stripes, areas of which are caused to glow by electrons incident on them,
    said color-picture tube having only one electron gun,
    a deflection system for deflecting the electrons, such that an electron beam produced by this electron gun is serially scanned across said screen along said phosphor stripe groups in the horizontal direction,
    wherein chromaticity of the respective color to be produced is determined by the position of the electron spot within a phosphor-stripe group and by the beam current, the color-picture tube further comprising:
    a vertical, comb-shaped electrode having teeth aligned with the groups of horizontal phosphor stripes and mounted along at least one vertical edge of the screen, outside the optically used area of the screen,
    means coupled to said vertical comb-shaped electrode for producing a control signal having a magnitude determined by the displacement of the electron beam from a desired vertical position relative to the teeth of the vertical, comb-shaped electrode, and
    means for applying said control signal to said deflection system for correcting the displacement.

2. A color-picture tube as claimed in claim 1, wherein the teeth of the comb-shaped electrode have a horizontal boundary and an inclined boundary, and that the minimum vertical dimension of the teeth is equal to the vertical dimension of the electron spot along the vertical edge of the screen.

3. A color-picture tube as claimed in any one of claims 1, or 2 wherein said phosphor-stripe groups each consist of three stripes, one each of red, green, and blue phosphor of the chromaticity which is standardized for the reception of color-television program.

4. A method of controlling the color display of a color-picture tube in a conventional color television set having a three voltage component control signal for controlling three beam intensities of a conventional color-picture tube, said color-picture tube having a screen coated with groups of phosphor stripes, areas of which are caused to glow by electrons incident on them, said phosphor stripe groups each consisting of three stripes, one each of a different color phosphor, said color-picture tube having only one electron gun, a deflection system for deflecting the electrons, such that an electron beam produced by this electron gun is serially scanned across said screen along said phosphor stripe group in the horizontal direction,
    wherein chromaticity of the respective color to be produced is determined by the position of the electron spot within a phosphor-stripe group and by the spot size and luminance is controlled by the beam current, said method of controlling including the steps of:
    identifying the strongest of the three voltage components of said control signal or one of the strongest in the event of equally strong components,
    assigning said strongest component to a first phosphor stripe of the color requiring the greatest exciting energy,
    assigning the other two signal components to the respective color stripes at a top stripe immediately above and a bottom stripe immediately below the first assigned stripe,
    providing a vertical coordinate signal proportional to the sum of the control signal components for the top stripe and the first stripe less the component for the bottom stripe,
    applying said vertical coordinate signal to said vertical deflection system such that when the vertical coordinate signal is zero, the electron spot center is in the vertical middle of the first stripe, providing an electron spot height signal proportional to the sum of the three components of said control signal, applying said electron spot height signal to the focusing electrode of the electron gun and to the beam intensity control circuit.

5. A method of adjusting the color of the color-picture tube as claimed in claim 4, and having a spot which extends over three stripe widths in the vertical direction and whose area on the upper or lower stripe is smaller than that on the middle stripe, including the steps of referring the spot center to the lower edge of one stripe, and extending the spot to cover parts of four stripes until the difference in areas covered on the respective stripes is sufficient for color reproduction, and that then the method described in claim 5 is used.

6. A color-picture tube for use in a conventional color television set having a three voltage component control signal for controlling three beam intensities of a conventional color picture tube, said color picture tube having a screen coated with groups of horizontal phosphor stripes, areas of which are caused to glow by electrons incident thereon, each of said phosphor stripe groups consisting of three stripes, each stripe having a phosphor of different chromaticity, said color picture tube comprising:

one electron gun;

a deflection system for deflecting the electrons, such that an electron beam produced by the electron gun is serially scanned across said screen along said phosphor stripe groups in the horizontal direction, said deflection system further comprising:

means for determining the chromaticity of the respective color to be produced by controlling the size of the beam and the position of the beam within a phosphor-stripe group with a control signal which is a function of the three voltage component control signal of the conventional color television set.

* * * * *